US010523730B2

(12) United States Patent
Olson et al.

(10) Patent No.: US 10,523,730 B2
(45) Date of Patent: Dec. 31, 2019

(54) REAL-TIME TRANSPORT PROTOCOL (RTP) MEDIA CONFERENCE SERVER ROUTING ENGINE

(71) Applicant: Infinesse Corporation, Westlake Village, CA (US)

(72) Inventors: Joseph Augustine Olson, Huntsville, AL (US); Michael Ern Kim, Los Angeles, CA (US); Christopher Young, Irvine, CA (US); Peter Raymond Hew, San Jose, CA (US)

(73) Assignee: Infinesse Corporation, Los Angeles, CA (US)

( * ) Notice: Subject to any disclaimer, the term of this patent is extended or adjusted under 35 U.S.C. 154(b) by 119 days.

(21) Appl. No.: 14/656,202

(22) Filed: Mar. 12, 2015

(65) Prior Publication Data

US 2015/0264103 A1 Sep. 17, 2015

Related U.S. Application Data

(60) Provisional application No. 61/951,904, filed on Mar. 12, 2014.

(51) Int. Cl.
*H04L 29/06* (2006.01)
(52) U.S. Cl.
CPC ........ *H04L 65/608* (2013.01); *H04L 65/1093* (2013.01); *H04L 65/403* (2013.01)
(58) Field of Classification Search
CPC ............... H04L 45/00; H04L 29/06027; H04L 29/12216; H04L 65/607; H04L 67/14;
(Continued)

(56) References Cited

U.S. PATENT DOCUMENTS 6,128,649 A * 10/2000 Smith .................... H04N 7/152
348/14.03
6,836,788 B2 * 12/2004 Kim ...................... H04L 12/185
709/203
(Continued)

OTHER PUBLICATIONS

RFC 3261 (Proposed Standard) SIP: Session Initiation Protocol, http://datatracker.ietf.org/doc/rfc3261/, last updated Mar. 2, 2013.
(Continued)

*Primary Examiner* — Sargon N Nano
(74) *Attorney, Agent, or Firm* — Socal IP Law Group LLP; Michael Harris; Jonathan Pearce

(57) ABSTRACT

The RTP Media Conference Server Routing Engine ("MC-SRE") integrates into a standards based RTP Media Server to improve server data throughput of RTP conference routing by factors of tens to hundreds while simultaneously decreasing real-time media delivery delays and significantly decreasing server resource requirements. The RTP MCSRE maintains a conference routing database used to manage a large number of conferences with a list of associated RTP sessions and conference participants. The routing engine also includes a Conference Session Routing Filter ("CSRF") and a Routing Logic Processor ("RLP") that selectively route received media streams to each participant in a given RTP conference. The behavior of both the CSRF and the RLP can be modified by executable scripts. The RTP MCSRE imposes floor control rules and packet filtering with regard to both network bandwidth and hardware resources specific to conference participant endpoint devices.

12 Claims, 13 Drawing Sheets

RTP Media Conference Routing Engine Architecture

(58) Field of Classification Search
CPC ... H04L 65/608; H04L 47/801; H04L 67/327;
H04L 69/327; H04L 65/403; H04L
65/1093; H04L 65/4076; H04L 2209/60;
H04M 15/56; H04M 2201/50; H04N
21/2347; H04N 21/6125; H04N 21/2402;
H04N 21/25833; H04N 7/15; H04N
7/148; H04N 65/1089; H04N 12/1822;
H04N 65/4015; H04N 12/1818; H04N
12/1827; H04N 29/06; H04N 29/06027;
H04N 67/306; H04N 65/80; H04N 67/14;
H04N 69/08; H04N 65/68; H04N 63/061;
H04N 12/18; H04N 29/201; H04N
12/1813
See application file for complete search history.

(56) References Cited

U.S. PATENT DOCUMENTS

| | | | | |
|---|---|---|---|---|
| 8,631,069 | B2* | 1/2014 | Maes | H04M 3/567 709/203 |
| 10,147,733 | B2* | 12/2018 | La Rosa | H01L 29/788 |
| 2004/0025186 | A1* | 2/2004 | Jennings | H04L 12/5695 725/93 |
| 2007/0294263 | A1* | 12/2007 | Punj | H04M 3/493 |
| 2009/0147787 | A1* | 6/2009 | Arulambalam | H04L 29/06027 370/392 |
| 2010/0169503 | A1* | 7/2010 | Kollmansberger | H04L 67/2804 709/231 |
| 2011/0038281 | A1* | 2/2011 | Saleem | H04L 12/1822 370/260 |
| 2011/0055550 | A1* | 3/2011 | Jung | H04L 12/6418 713/151 |
| 2011/0299601 | A1* | 12/2011 | Lai | H04N 21/234327 375/240.25 |
| 2014/0289326 | A1* | 9/2014 | McCormack | H04L 65/1006 709/204 |
| 2014/0355616 | A1* | 12/2014 | Coban | H04L 65/607 370/395.1 |
| 2015/0188962 | A1* | 7/2015 | Bulava | H04L 65/4076 709/231 |

OTHER PUBLICATIONS

RFC 3550 (Internet Standard) RTP: A Transport Protocol for Real-Time Applications, http://datatracker.ietf.org/doc/rfc3550/, last updated Mar. 2, 2013.
RFC 3711 (Proposed Standard) SRTP: The Secure Real Time Transport Protocol, http://datatracker.ietf.org/doc/rfc3711/, last updated Mar. 2, 2013.
RFC 4425—RTP Payload Format for Video codec 1 (VC-1), https://tools.ietf.org/html/rfc4425, Feb. 2006.
RFC 5109—RTP Payload Format for Generic Forward Error Correction, http://tools.ietf.org/html/rfc5109, Dec. 2007.
RFC 5285—A General Mechanism for RTP Header Extensions, http://tools.ietf.org/html/rfc5285, Jul. 2008, Qualcomm.
RFC 6184—Proposed Standard, RTP Payload Format for H.264 Video, http://tools.ietf.org/html/rfc6184, May 2011, WorldGate Communications.
RFC 6190—RTP Payload Format for Scalable Video Coding, http://tools.ietf.org/html/rfc6190, May 2011, Vidyo.
DRAFT-IETF-AVTCORE-SRTP-EKT, Encrypted Key Transport for SRTP, https://datatracker.ietf.org/doc/draft-ietf-avtcore-srtp-ekt/, last updated Feb. 14, 2014.
DRAFT-IETF-PAYLOAD-VP8-11—RTP Payload Format for VP8 Video, http://tools.ietf.org/html/draft-ietf-payload-vp8-11, Feb. 10, 2014, Google.
Eleftheriadis, R, et al., "Multipoint Videoconferencing with Scalable Video Coding," Journal of Zhejiang University Science A, ISSN 1862-1775 (Online), pp. 696-705, vol. 7, No. 5, May 2006.
J.-R. Ohm, "Advances in Scalable Video Coding," Proc. IEEE, vol. 93, No. 1, pp. 42-56, Jan. 2005.
Schierl, T, et al., "SVC-based Multisource Streaming for Robust Video Transmission in Mobile Ad Hoc Networks," IEEE Wireless Commun. Mag. (Special Issue on multimedia in Wireless/Mobile Ad Hoc Networks), Oct. 2006, pp. 96-103, vol. 13, No. 5.
ITU-T and ISO/IEC JTC 1, "Advanced Video Coding for Generic Audiovisual Services," ITU-T Recommendation H.264 and ISO/IEC 14496-10 (MPEG-4 AVC), Version 8 (including the SVC extension): Consented in Jul. 2007.
World Intellectual Property Organization, International Search Report and Written Opinion for International Application No. PCT/US2015/20247, dated Jun. 29, 2015, pp. 1-14.

* cited by examiner

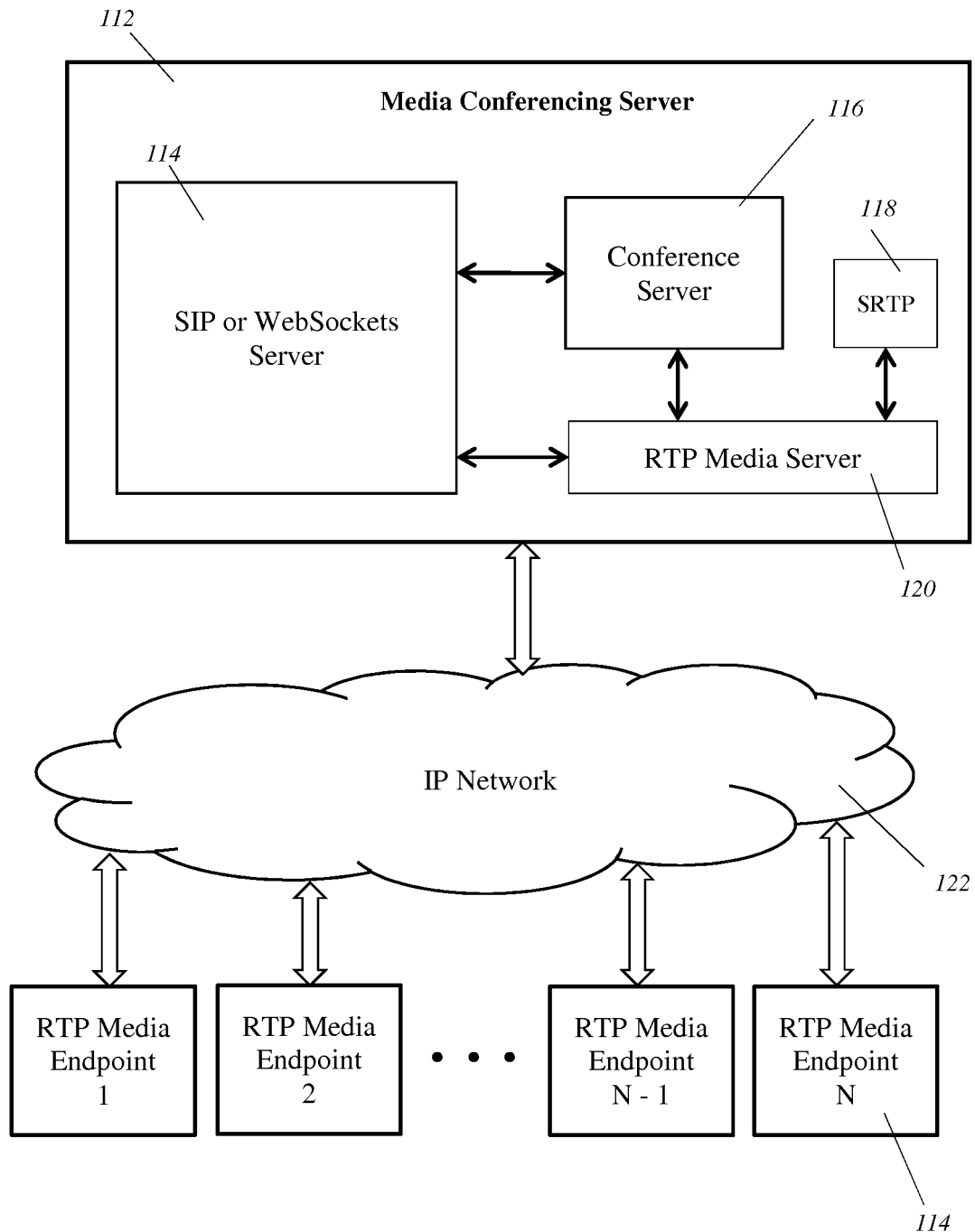
Figure 1 Generic Media Conferencing System Architecture

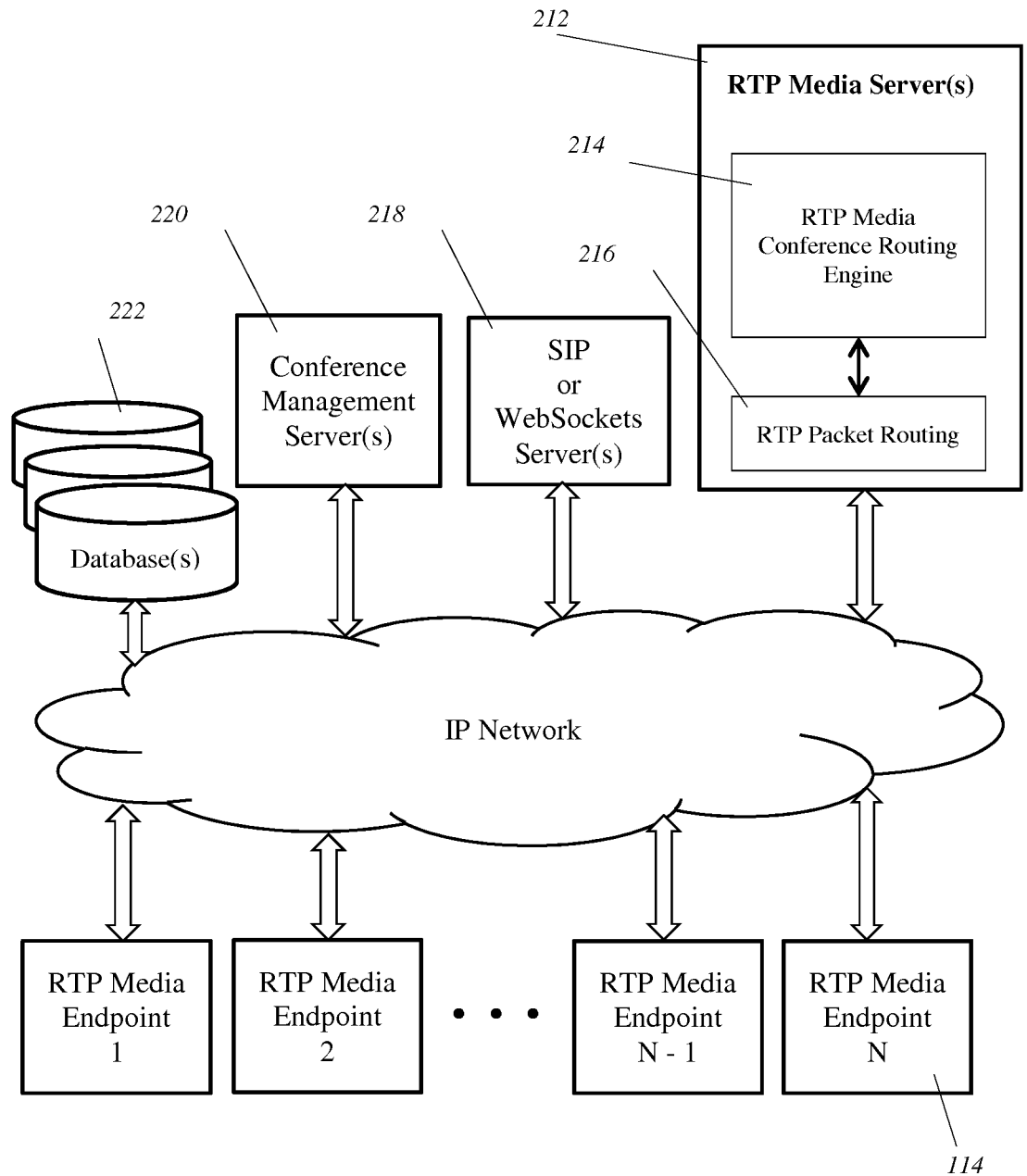
Figure 2 Routed RTP Media Distributed Conferencing System Architecture

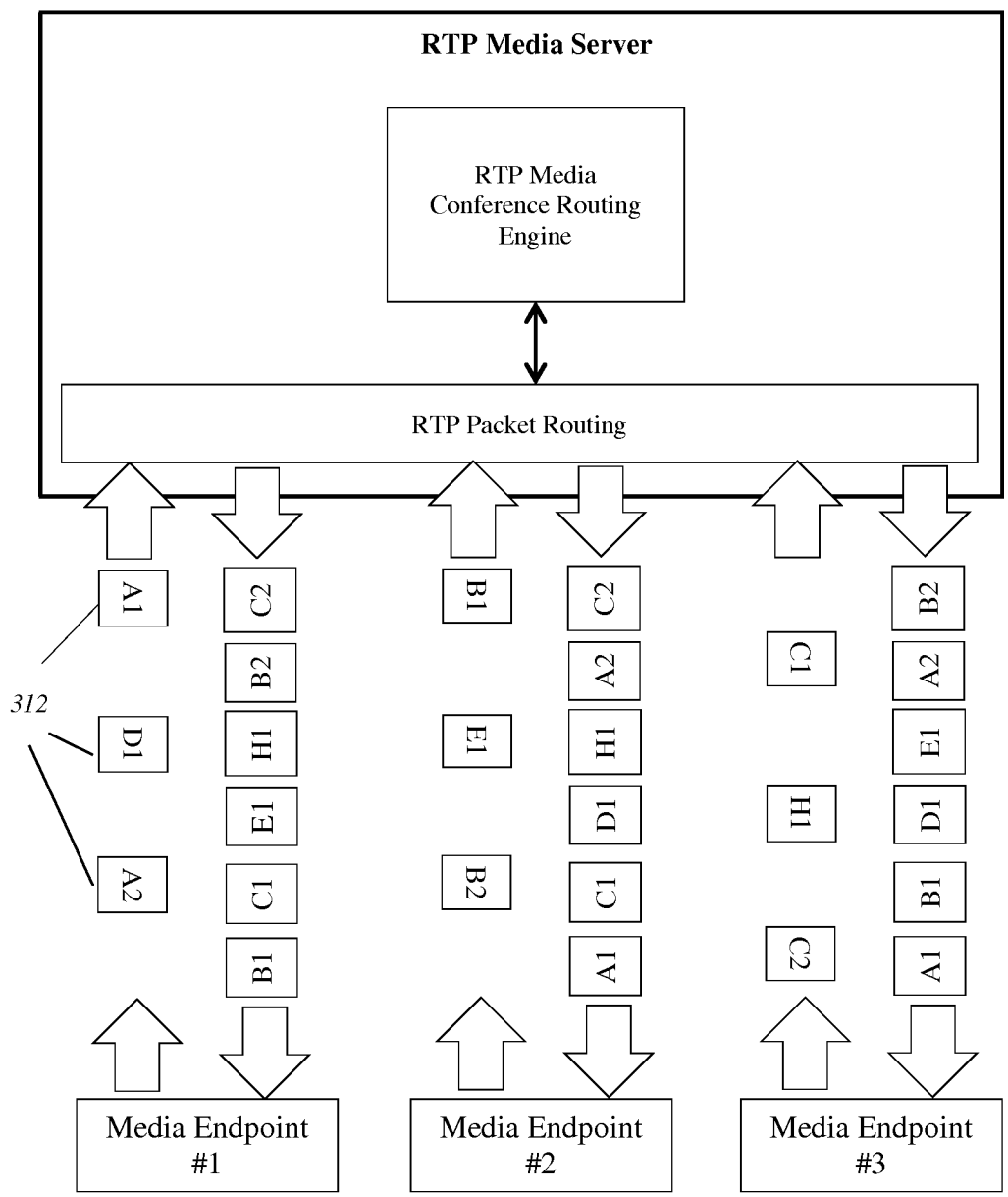
Figure 3 RTP Media Stream Packet Routing

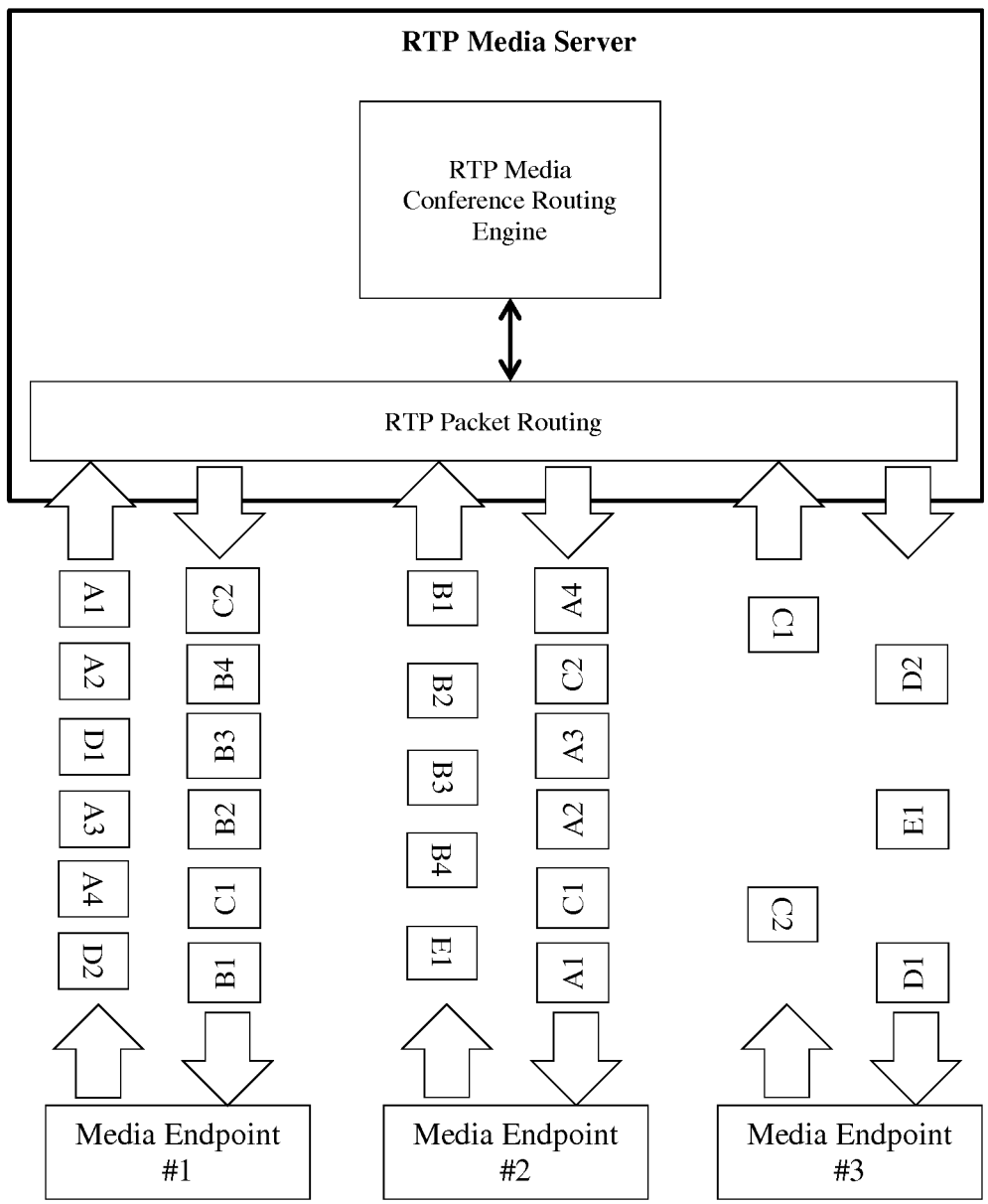
Figure 4 RTP Media Stream Filtered Packet Routing

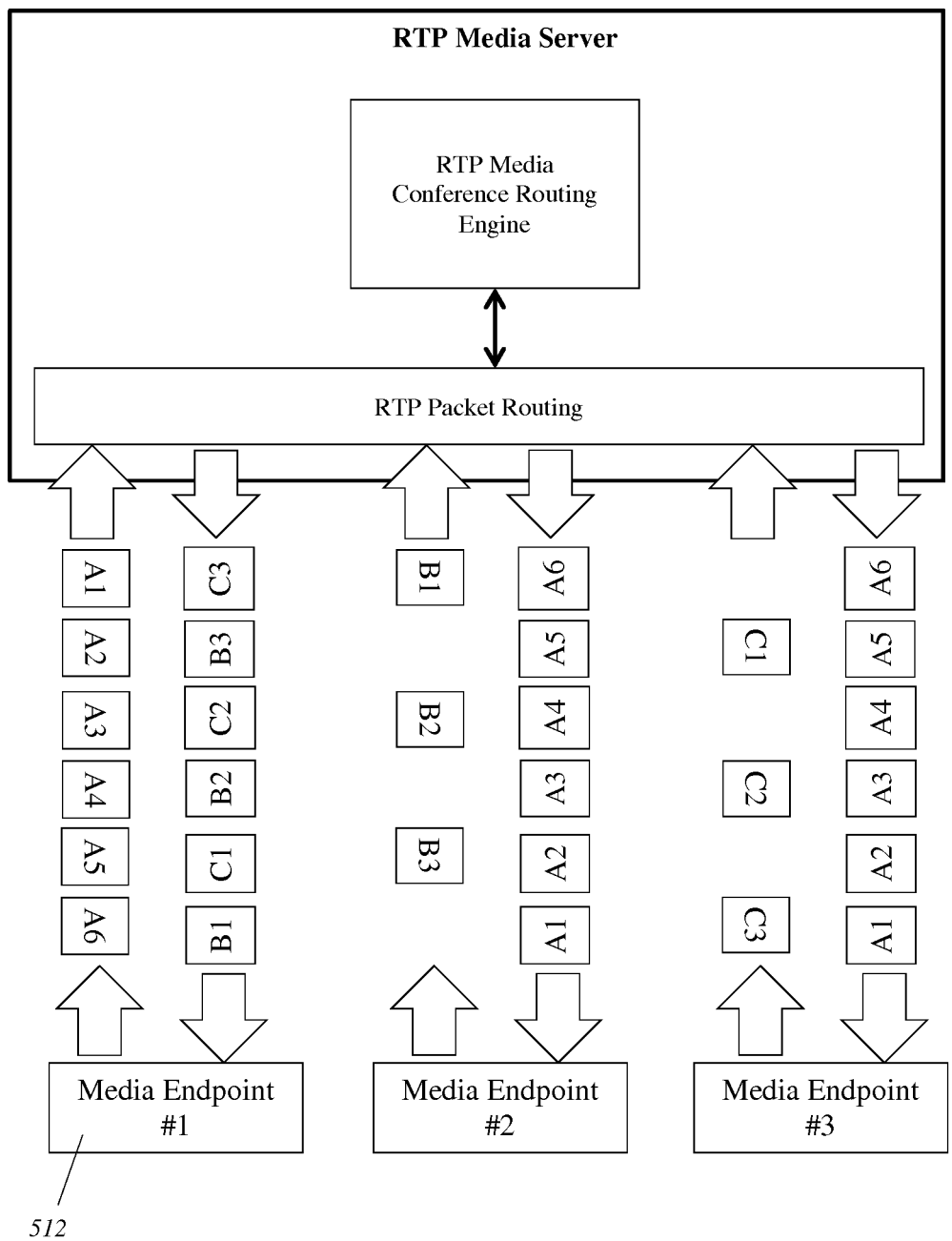
Figure 5 RTP Media Routing with MCU Endpoint

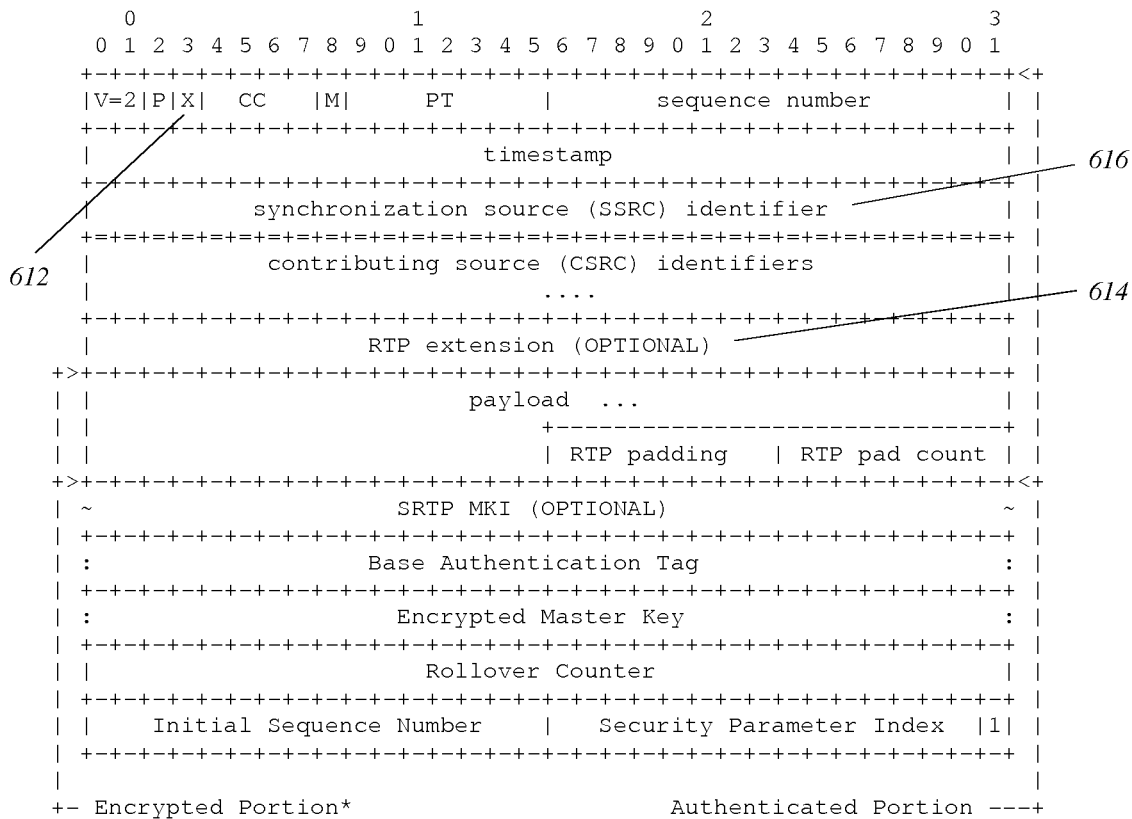
Abbreviated EKT format when EKT parameter set is not appended to SRTP packet:
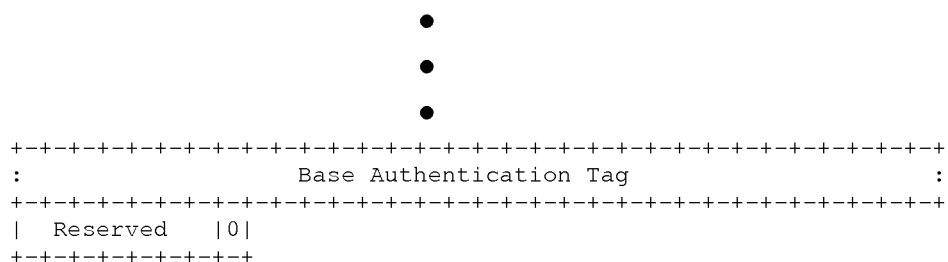
Figure 6 SRTP with EKT Packet Format

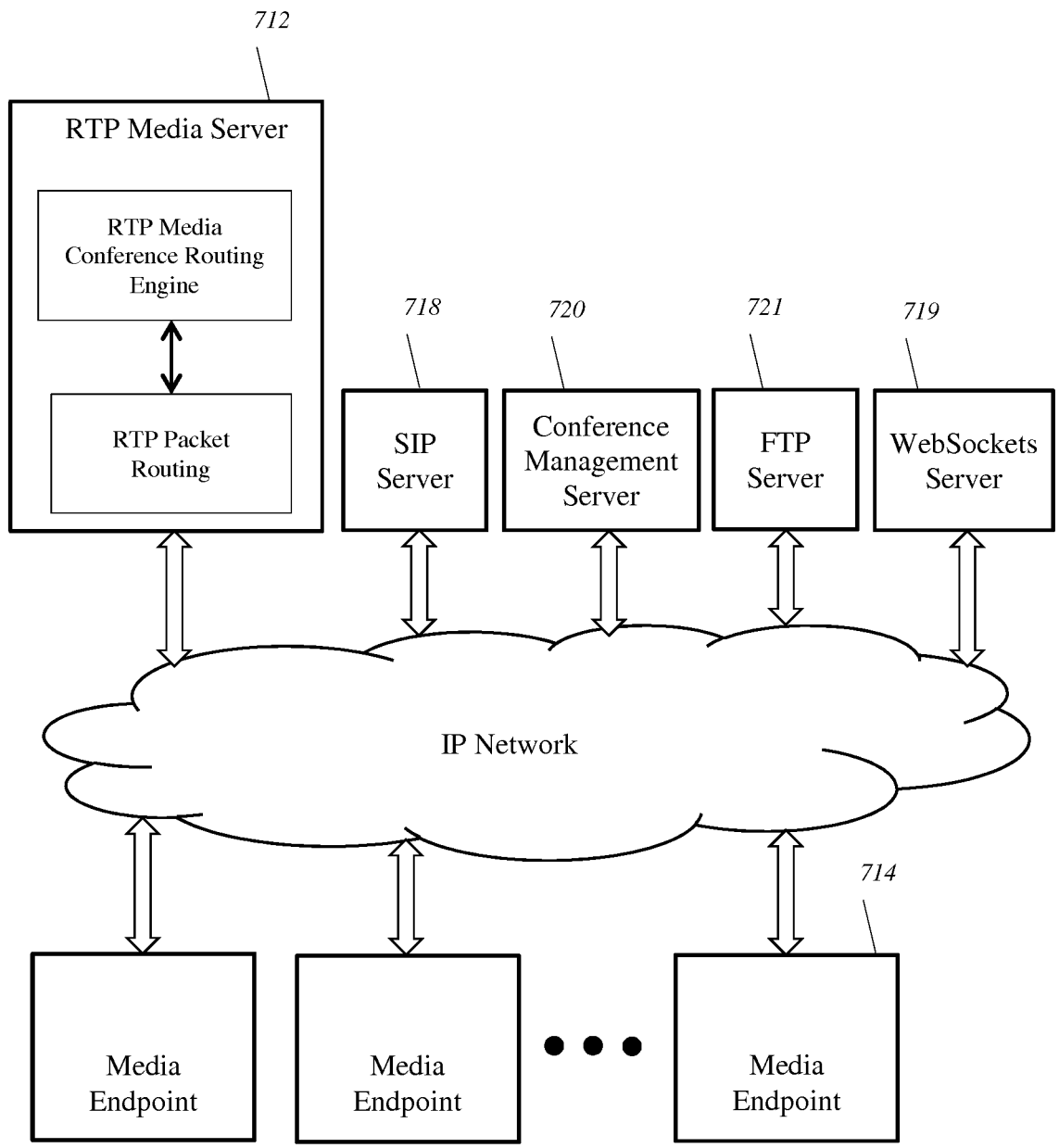
Figure 7 Distributed RTP Media Conferencing Augmented With Additional Servers

```
b=TIAS:650000
b=AS:650
        •
        •
        •
m=audio 6000 RTP/AVP 111
a=rtpmap:111 SIREN/16000
a=fmtp:111 bitrate=16000
m=audio 6001 RTP/AVP 0
a=rtpmap:0 PCMU/8000
m=audio 6003 RTP/AVP 105
a=rtpmap:105 iLBC/8000
m=video 49170 RTP/AVPF 99
b=TIAS:50000
b=AS:50
a=rtpmap:99 VP8/90000
a=fmtp:99 max-fr=30; max-fs=3600;
m=video 49171 RTP/AVPF 99
b=TIAS:250000
b=AS:250
a=rtpmap:99 VP8/90000
a=fmtp:99 max-fr=30; max-fs=3600;
m=video 49172 RTP/AVP 101
b=TIAS:50000
b=AS:50
a=rtpmap:101 VC1/90000
a=fmtp:101 profile=0;level=2;width=352;height=288;framerate=15000;
   bitrate=384000;buffer=2000;config=4e291800
m=video 49172 RTP/AVP 101
b=TIAS:250000
b=AS:250
a=rtpmap:101 VC1/90000
a=fmtp:101 profile=0;level=2;width=352;height=288;framerate=15000;
   bitrate=384000;buffer=2000;config=4e291800
m=video 20000 RTP/AVP 97 96
a=rtpmap:96 H264/90000
a=fmtp:96 profile-level-id=4de00a; packetization-mode=0;
   sprop-parameter-sets={sps0},{pps0};
a=rtpmap:97 H264-SVC/90000
a=fmtp:97 profile-level-id=53000c; packetization-mode=1;
   sprop-parameter-sets={sps0},{pps0},{sps1},{pps1};
a=crypto:1 AES_CM_128_HMAC_SHA1_80
   inline:WVNfX19zZW1jdGwgKCkgewkyMjA7fQp9CnVubGVz|2^20|1:4
   FEC_ORDER=FEC_SRTP EKT=AESKW_128|WWVzQUxvdmVseUVLVGtleQ|AAE0
a=extmap:4096 URI-conference-routing DQGHTM2w5
```

Figure 8 RTP Conference Endpoint Configuration with SIP SDP Extensions

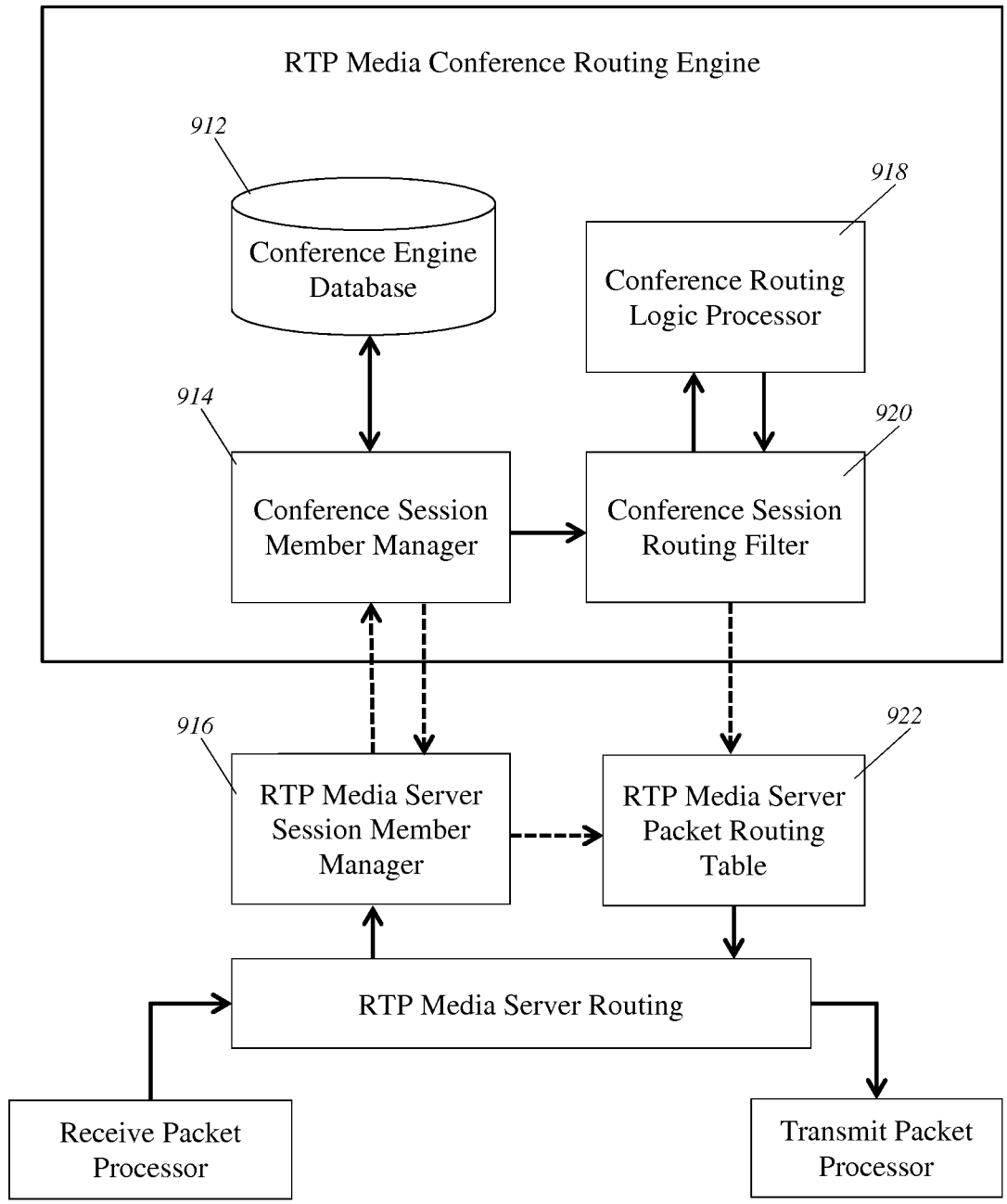
Figure 9 RTP Media Conference Routing Engine Architecture

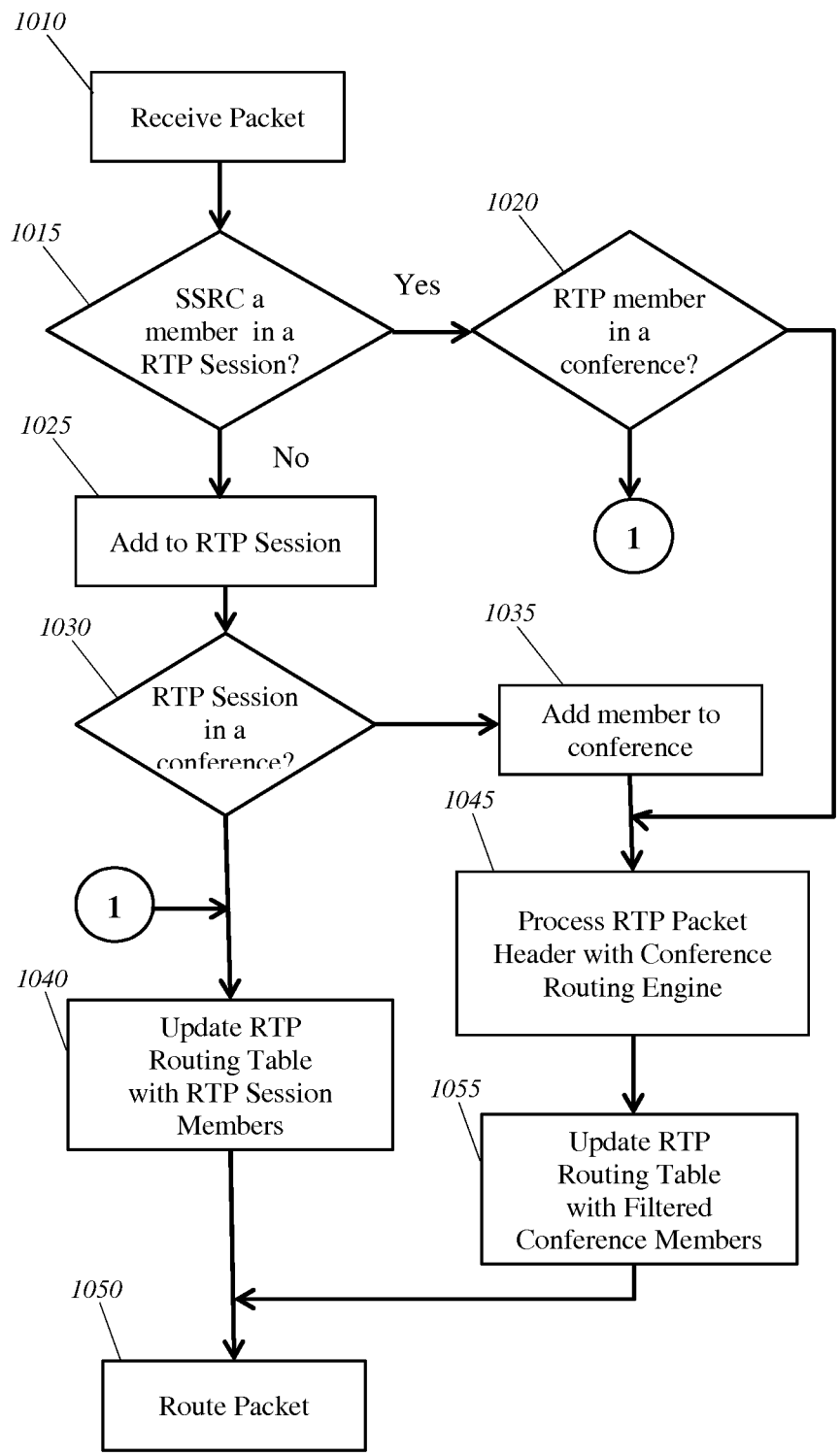
Figure 10 RTP Media Server Packet Processing Flow Diagram

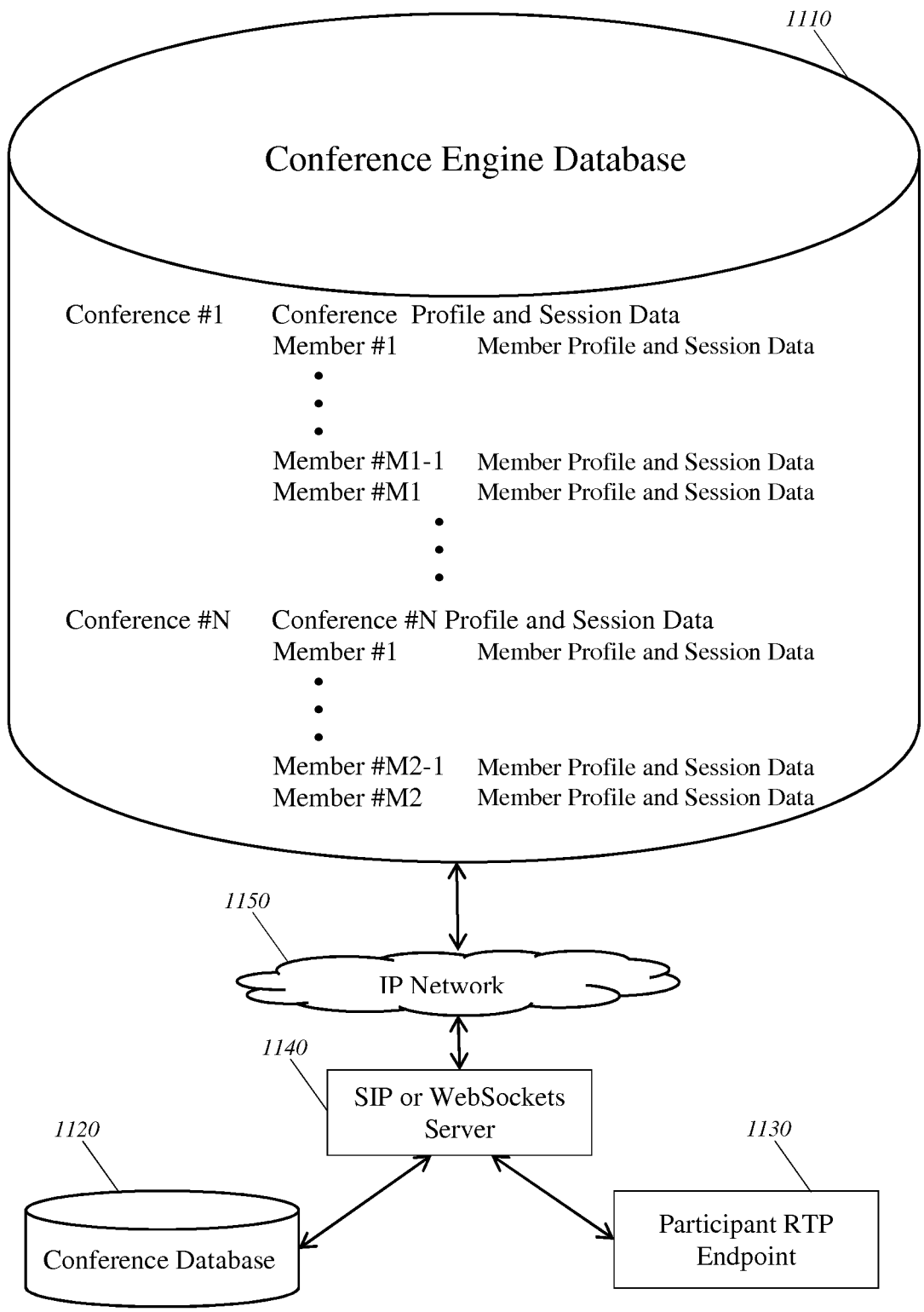
Figure 11 Conference Engine Database Data Sources

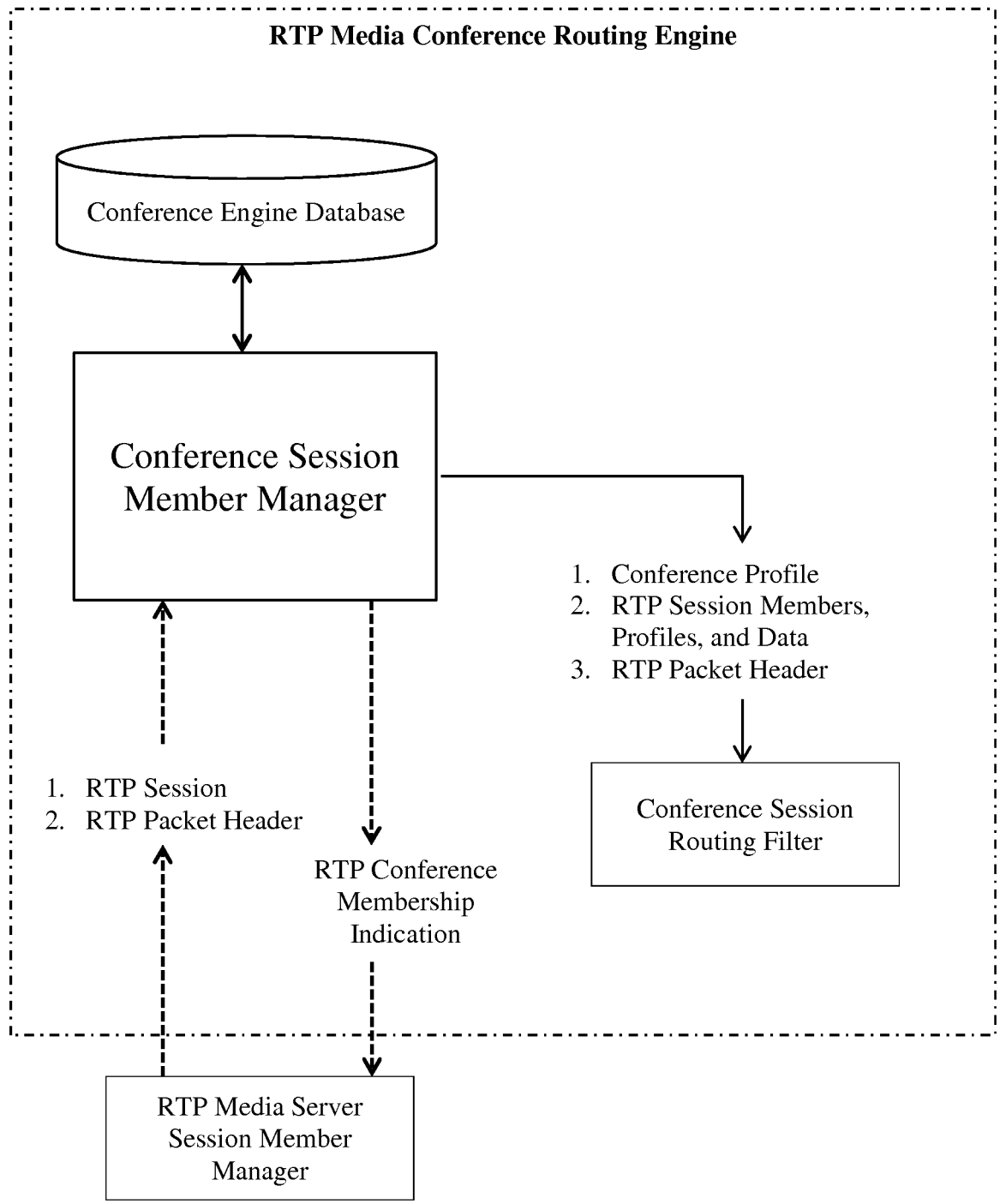
Figure 12 Conference Session Member Manager Data Interactions

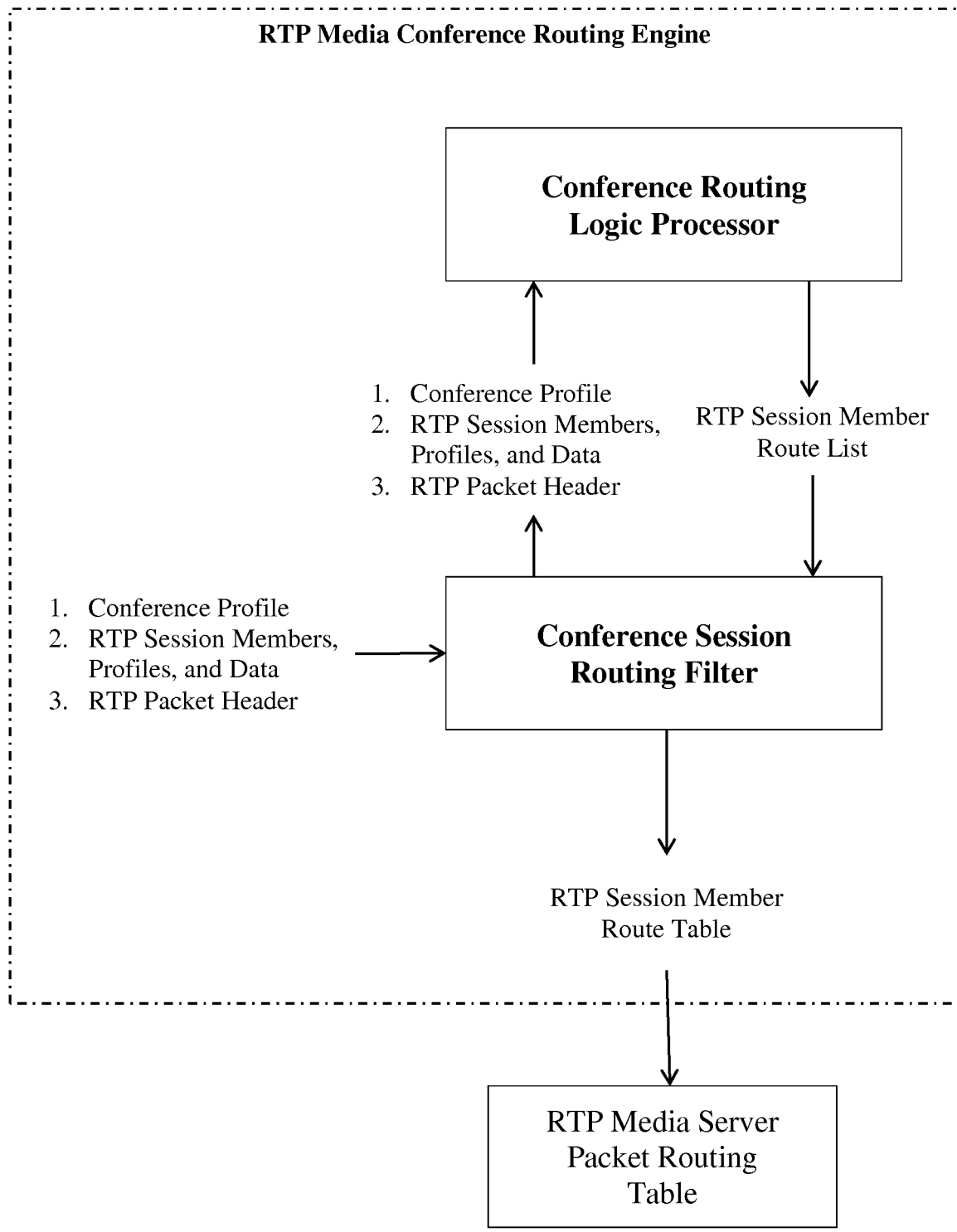
Figure 13 Conference Session Routing Filter and Logic Processor

REAL-TIME TRANSPORT PROTOCOL (RTP) MEDIA CONFERENCE SERVER ROUTING ENGINE

RELATED APPLICATION INFORMATION

This patent claims priority from the following provisional patent applications: U.S. Patent Application No. 61/951,904, titled "Real-Time Transport Protocol (RTP) Media Conference Server Routing Engine" and filed Apr. 7, 2014.

BACKGROUND

1. Field

The present invention integrates into a Real-time Transport Protocol (RTP) Media Routing Server to dynamically manage routable media conferences among distributed networked clients that are sending and receiving RTP media streams.

2. General Background and State of the Art

The following related art may be relevant to this disclosure:

RFC 3261-SIP: Session Initiation Protocol (http://datatracker.ietf.org/doc/rfc3261/)

RFC 3550-RTP: A Transport Protocol for Real-Time Applications (http://datatracker.ietf.org/doc/rfc3550/)

RFC 3711-SRTP: The Secure Real Time Transport Protocol (http://datatracker.ietf.org/doc/rfc3711/)

RFC 4425-RTP Payload Format for Video codec 1 (VC-1) (https://tools.ietf.org/html/rfc4425)

RFC 5109-RTP Payload Format for Generic Forward Error Correction (http://tools.ietf.org/html/rfc5109)

RFC 5285-A General Mechanism for RTP Header Extensions (http://tools.ietf.org/html/rfc5285)

RFC 6184-Proposed Standard, RTP Payload Format for H.264 Video (http://tools.ietf.org/html/rfc6184)

RFC 6190-RTP Payload Format for Scalable Video Coding (http://tools.ietf.org/html/rfc6190)

DRAFT-IETF-AVTCORE-SRTP-EKT—Encrypted Key Transport for SRTP (https://datatracker.ietf.org/doc/draft-ietf-avtcore-srtp-ekt/)

DRAFT-IETF-PAYLOAD-VP8-11—RTP Payload Format for VP8 Video (http://tools.ietf.org/html/draft-ietf-payload-vp8-11)

Eleftheriadis, R. Civanlar, and O. Shapiro, "Multipoint Videoconferencing with Scalable Video Coding," in J. Zhejiang Univ. —Science A, ISSN 1862-1775 (Online), vol. 7, no. 5, pp. 696-705, May 2006

J.-R. Ohm, "Advances in Scalable Video Coding," Proc. IEEE, vol. 93, no. 1, pp. 42-56, January 2005.

T. Schierl, K. Gänger, T. Wiegand, and T. Stockhammer, "SVC-based Multisource Streaming for Robust Video Transmission in Mobile Ad Hoc Networks," IEEE Wireless Commun. Mag. (Special Issue on multimedia in Wireless/Mobile Ad Hoc Networks), vol. 13, no. 5, pp. 96-103, October 2006.

ITU-T and ISO/IEC JTC 1, "Advanced Video Coding for Generic Audiovisual Services," ITU-T Recommendation H.264 and ISO/IEC 14496-10 (MPEG-4 AVC), Version 8 (including the SVC extension): Consented in July 2007.

SUMMARY

The disclosed RTP media conference server routing engine when integrated into a routed RTP conferencing system can significantly improve upon typical media control unit (MCU) based conferencing systems as follows:

1. Increase data throughput by thousands of percent for secured RTP conference routers that route above the RTP network layer; throughput can increase by hundreds of thousands percent for media mixing MCU's.

2. Significantly decrease server CPU and memory resource loading.

3. Significantly decrease delay in delivery of real-time media.

4. Efficiently make routing decisions and also providing in-band signaling dynamically to ensure media compatibility as Participant RTP Endpoints enter and leave conferences as well as starting new media streams and terminating established media streams during a conference.

5. Support all standard media formats.

These improvements result in tremendous savings in systems deployment and maintenance costs as the number of servers required are less than 10% of application layer base conference routing systems and less than 1% for media mixing MCU based conferencing systems. Additionally, the flexibility of the system's efficient dynamic routing and in-band media signaling can ensure that media streams are mixed and translated if needed and are properly routed to conference participants. System goals are to maximize participant conference experience and minimize server processor load.

In one embodiment, a RTP Media Conference Server Routing Engine is integrated into a standards based RTP Media Server. The RTP Media Conference Server Routing Engine maintains a conference routing database used to manage a large number of conferences, each with a Conference Profile, a list of associated RTP sessions and a list of conference participants and associated conference participant profiles. The RTP Media Conference Server Routing Engine contains a Conference Session Routing Filter and a Routing Logic Processor that selectively route received media streams to each participant in a given RTP conference. The behavior of both the Conference Session Routing Filter and the Routing Logic Processor can be modified by executable scripts obtained from the associated Conference Profile The RTP Media Conference Server Routing Engine imposes floor control rules and packet filtering with regard to both network bandwidth and hardware resources specific to conference participant endpoint devices. Security and FEC for RTP media streams is managed by the distributed network client devices and does not interfere with the direct routing of the RTP packets in the RTP Media Routing Server. It has features that use allowed options per the related RFC specifications but does not require such options for normal operation and can interoperate with any standards based RTP endpoint capable of generating SRTP packets using EKT.

BRIEF DESCRIPTION OF THE DRAWINGS

FIG. 1 shows the architecture for a generic RTP media conferencing system. Shown in the drawing is an RTP media server used to receive and transmit RTP packets between device endpoints that require point-to-point connections with the RTP media server. RTP media streams are secured with SRTP and all received RTP packets must be decrypted prior to conference processing and encrypted for each P2P RTP connection with the conference participants.

FIG. 2 shows a distributed server architecture for a routed RTP media conferencing system. The conference server routing engine is integrated into the RTP Media Server.

FIG. 3 shows an embodiment that provides routing of all RTP media streams in a RTP media conference.

FIG. 4 shows two embodiments with filtered routing of RTP media streams in a RTP media conference.

FIG. 5 shows an embodiment of media routing in a RTP media conference with one endpoint functioning as an MCU to integrate multiple video and audio streams into composite video and audio streams for retransmission to the conference routing server.

FIG. 6 shows fields within the RTP packet that affect and are affected by RTP conference routing as well as SRTP with EKT.

FIG. 7 shows distribution of conferencing media augmented with additional services such as an FTP conferencing server to distribute photo images for guaranteed delivery in paused and snapshot video modes, or application file sharing.

FIG. 8 shows SDP media attributes and attribute extensions used with SIP conferencing server to configure RTP conference participant endpoints and also update the RTP Media Server and the integrated RTP Media Conference Routing Engine.

FIG. 9 shows the RTP Media Conference Routing Engine architecture.

FIG. 10 shows a flow diagram for RTP packet processing in a RTP Media Server integrated with the Media Conference Routing Engine.

FIG. 11 identifies the Conference Engine Database data sources and the data associated with the Conference and Member Participant levels.

FIG. 12 shows the data interactions between the Conference Session Member Manager, RTP Media Server Session Member Manager, Conference Engine Database, and Conference Session Routing Filter.

FIG. 13 shows the RTP header, decision data, list of session members, and optional conference scripts as inputs to the Conference Session Routing Filter and Logic Processor and the packet routing table output to the RTP Media Server for routing.

DETAILED DESCRIPTION

FIG. 1 shows a generic media conferencing system 112 using an RTP (Real-time Transport Protocol) Media Server 120 for sending and receiving media over an IP (Internet Protocol) network 122. A media conferencing system contains two or more RTP Media endpoint devices 114, shown as RTP Media Endpoint 1 to RTP Media Endpoint N, that send and receive RTP media packets through the IP network to the RTP Media Server 120 that sends the media to a Conference Server 116 for additional processing. RTP Network connections in these systems are point-to-point (P2P) and the Conference Server 116 routes each media stream to the conference participants using floor-control rules and when needed media conversions and mixing. SRTP (Secure RTP) 118 is used to secure the RTP media streams and the RTP Media Server 120 must establish P2P SRTP connections with each endpoint device. SRTP over P2P connections requires each connection to the RTP Media Server 120 to maintain a separate SRTP profile and as such requires that each SRTP media stream received by the RTP Media Server 120 be decrypted prior to being further processed in the Conference Server 116 and then encrypted for each of the P2P connections with the other conference participants. The server processor loading for SRTP decryption of each packet received and SRTP encryption of each packet transmitted along with any additional media conversions and mixing of the decrypted media payloads can be hundreds to tens of thousands greater than in a distributed conferencing system that routes all RTP media streams without any RTP packet payload processing.

FIG. 2 shows an RTP media conference system that distributes the RTP payload processing to conference participant endpoint devices 114 and uses the RTP Media servers 212 to route RTP media streams. The architecture of this system is typical of a distributed SIP/RTP VOIP communications system with a networked database 222, SIP (Session Initiation Protocol) and/or Websockets servers 218, RTP media servers, a Conference Management Server 220 used to manage user registrations and conference configurations, and SIP client devices designated as "RTP Media Endpoint" 114 in the drawing. The RTP Media Conference Routing Engine (RTP MCRE) 214 has been integrated into the RTP Media Server to allow the RTP Routing Module 216 to perform all conference routing activities at the RTP network level without the need to perform any processing or additional handling of the RTP payload data. With the use of the Encrypted Key Transport (EKT) extension to SRTP by the sending endpoint devices, the system allows the RTP Routing Module to route all RTP packets without the need to decrypt and re-encrypt the SRTP media packets. SRTP is not required by the RTP Routing Module if all conference participants support EKT.

FIG. 7 shows distribution of conferencing media augmented with additional services. In particular, FIG. 7 shows an RTP media conference system which includes an RTP Media Server 712, a SIP server 718, a Conference Management Server 720, an FTP Server 721, a WebSockets Server 719 and Media Endpoint(s) 714. The RTP media conference system distributes the RTP payload processing to conference participant endpoint devices 714 and uses the RTP Media servers 712 to route RTP media streams. The architecture of this system is typical of a distributed SIP/RTP VOIP communications system with a, SIP (Session Initiation Protocol) Server 718, a WebSockets Server 719, an FTP Server 721, and a Conference Management Server 720 used to manage user registrations and conference configurations, and SIP client devices designated as "RTP Media Endpoint" 114 in the drawing. The RTP Media Conference Routing Engine has been integrated into the RTP Media Server 712 to allow the RTP Packet Routing to perform all conference routing activities at the RTP network level without the need to perform any processing or additional handling of the RTP payload data. With the use of the Encrypted Key Transport (EKT) extension to SRTP by the sending endpoint devices, the system allows the RTP Routing Module to route all RTP packets without the need to decrypt and re-encrypt the SRTP media packets. SRTP is not required by the RTP Packet Routing if all conference participants support EKT.

A conference is created with the Conference Management Server and stored in the networked database. An endpoint device 114 uses a SIP server 218 to join a conference using the Session Description Protocol (SDP). The SIP server 218 receives the endpoint device capabilities using SDP media attributes and assigns RTP ports for the conference media streams. The RTP ports can be either unique ports assigned to each stream for each device or ports shared by all participants within a given conference unique only to the different media streams. Included in the SDP exchange between each RTP Media Endpoint 114 and the SIP server 218 is the SRTP with EKT encryption parameters, optional FEC (Forward Error Correction) parameters, and additional packet filtering parameters used to configure the optional RTP header extension field which is unique to each RTP Media Endpoint's RTP media stream. The SIP server 218 communicates with both the RTP Media Server 212 to establish the RTP port configurations and also the RTP MCRE 214 with the conference parameters and endpoint device capabilities obtained from both the conference database 222 and the SDP.

FIG. 6 identifies the three fields in the RTP packet header used by the system. Normal RTP Media Server processing matches the synchronization source (SSRC) identifier 616 in received RTP packets to a session member table and retrieve or create a RTP member object containing networking addressing and other relevant information associated with the processing of RTP media streams. Integration of the system into a RTP Media Server, such as RTP Media Server 212 in FIG. 2, affects RTP packet processing as outlined in FIGS. 9 and 10 and described as follows:

1. When the synchronization source (SSRC) identifier 616 of the received packet is not in the Server Session Member Manager Table 916 in FIG. 9, and the session associated with the SSRC is also associated with a conference in the RTP MCRE, when the new member is added to Server Session Member Table the member is also added to the RTP MCRE Conference Member Table in the Conference Engine Database 912. Additionally a reference to the RTP MCRE Conference Member Table entry is added to the Server Session Member Table entry.

2. If the SSRC of the received packet is in the Server Session Member Table and the Server Session Member Table entry contains a reference to a RTP MCRE Conference Member Table entry, the received RTP packet header is sent to the RTP MCRE Conference Session Manager 914 which determines the list of conference participants associated with the RTP session. The Conference Session Routing Filter 920 processes the conference participant list with the Conference Routing Logic Processor 918. The Logic Processor processes the conference routing algorithm logic with the Conference Profile, associated participant profiles and the RTP Extension Header. The resulting routing list is loaded into the RTP Media Server Packet Routing Table 922 and the RTP packet is routed without any further processing by the RTP Media Server. Otherwise the received packet is processed normally by the RTP Media Server and routed according to the normal routing decisions made by the SRTP Media Server Session Member Manager. The normal fall back behavior of the RTP Media Server makes the integration of the RTP MCRE system transparent to RTP media streams not associated with a RTP MCRE conference.

RTP MCRE conference table entries are removed after an RTP 'BYE' packet type with an associated SSRC has been processed by the RTP Media Server, after not receiving any RTP traffic associate with the SSRC for a specified time (RTP Timeout), or after receiving an indication from the SIP server that the participant has disconnected from the conference.

A feature of the MCRE is a scripting feature that allows the behavior of both the Conference Routing Logic Processor and the Conference Session Routing Filter to be modified by executing optional scripts that can be loaded from the Conference Profile. These scripts can be integrated with data pattern associations in the RTP Extension Header to create new Conference Routing decisions as technology and systems evolve.

FIG. 11 shows the Conference Engine Database 1110 data sources and the data associated with the Conference and Member Participant levels. The information provided for each RTP endpoint device, such as RTP Media Endpoint 114 in FIG. 1, by the SIP or Websockets server 1140 to the RTP MCRE over the IP Network 1150 includes information provided by both the Conference Database 1120 and the participating RTP endpoint devices 1130. The participating RTP endpoint devices 1130 provide information via the SDP dialog with the SIP or Websockets server when joining a conference. FIG. 8 shows the attributes that are provided by the participating RTP endpoint 1130 described as follows:

1. Maximum total bandwidth for all RTP sessions from either b=TIAS or b=AS provided at the SDP session level.

2. List of all available RTP media sessions with "media=" attribute.

3. For each RTP media session:

a. RTP port to payload type and codec mapping with a=rtpmap attribute.

b. Media specific formatting such as video profile or audio bandwidth with a=fmtp attribute.

c. Bandwidth for RTP media session with either b=TIAS or b=AS attributes.

d. Security information for SRTP, EKT, and FEC with a=crypto attribute.

e. RTP header extension field parameters with a=extmap attribute.

Also provided is information for the conference obtained from the Conference Database:

1. Conference ID

2. Conference Profile

3. Conference recording URL if recording enabled

4. Conference log URL if logging enabled

The MCRE Conference Session Routing Filter and Conference Session Logic Processor, shown in FIG. 13, uses this information along with the optional RTP header extension data 614, indicated with the RTP header extension flag 612, to determine whether RTP packets from the various RTP media streams for each RTP session in the conference are forwarded to each of the conference participants. The MCRE Conference Session Member Manager shown in FIG. 12 determines if the RTP session member associated with a received packet is also a RTP Conference Session Member. If it is, then the associated Conference information and list of Conference Members is compiled by the Conference Session Member Manager and presented along with the RTP Packet Header to the MCRE Conference Session Routing Filter for route decision processing.

A Conference Profile is established when a conference is created on the conference server. The profile is stored in the conference database and is referenced by RTP Media Endpoint Devices as well as the SIP or Websockets server. RTP Media devices obtain the Conference Profile from the conference server along with other necessary conferencing parameters prior to joining a conference with either a SIP or Websockets server. The SIP or Websockets server references the Conference Profile when RTP Media Endpoints join a conference. The Conference Profile contains information needed by the SIP or Websockets server to properly negotiate the OFFER/ANSWER dialog with the RTP Media Endpoint that establishes the RTP session media and related attributes such as max bandwidth, RTP port mappings and payload type, codec and video profile. Also included are optional conference extensions specific to the system such as whether the endpoint device can function as an MCU and associated MCU capabilities such as maximum network bandwidths and supported codecs.

FIG. 3 shows the simplest conference routing profile with unfiltered RTP packet routing by the RTP MCRE between multiple endpoints. The drawing shows an example of each endpoint device sending two RTP media streams with each RTP packet 312 labeled alphabetically to reflect the RTP media stream (A, B, C, . . . ) and the consecutive sending order (1, 2, 3, . . . ). In this embodiment only two RTP sessions are presented to the endpoints in the SDP of the ANSWER response. One session is used for audio media and the other for video media. Since only one stream is available for each media type, all endpoints must use the same audio codec and video codec. In this embodiment, all packets are routed between all endpoints participating in the conference. The video RTP session contains media streams A, B, and C. The audio RTP session contains media streams D, E, and H.

FIG. 4 represents a conference with filtered RTP packet routing. The drawing shows that endpoint #1 is sending two media streams represented with alphabetic labels A and D. Endpoint #2 is also sending two media streams labeled B and E. Endpoint #3 is sending a single media stream labeled C. This drawing can be used to illustrate two embodiments.

In one embodiment, media streams A and B represent higher fidelity media such as H264 Advanced Profile video or high bandwidth stereo audio. Streams C, D, and E represent lower fidelity media such as H264 Base Profile video or low bandwidth mono PCM audio. The RTP MCRE routes the higher fidelity media stream A from endpoint #1 to endpoint #2 and the lower fidelity stream D to endpoint #3. Streams B and E from endpoint #2 are likewise routed to endpoints #1 and #3. The lower fidelity media stream C from endpoint #3 is routed to both of the other endpoints.

A second embodiment of the drawing in FIG. 4 is with different encodings on the media streams. Audio streams A and B are encoded with Siren7, while audio streams C, D, and E are encoded with iLBC. Routing is same as in previous embodiment however since endpoints #1 and #2 transmit and receive both audio formats, both are required to support the Siren7 and iLBC codecs.

With no known exceptions, the RTP MCRE can be configured to route RTP streams associated with any media. This includes:
1. Multiple media layer streams generate with SVC (Scalable Video Codecs)
2. Multiple media streams generated from the same raw media input with different codecs such as:
  a. H264, VC-1, or VP8 for video media
  b. PCMU, iLBC, or Siren7 for audio media
3. Multiple media streams generate from the same raw media input but with different quality and bandwidths such as:
  a. Low resolution "thumbprint" video at 30 kbps, normal resolution 800×600, 20 fps video for desktop video conferencing, and HD for conference room or telepresence.
  b. Low fidelity voice delivered at 12 kbps, medium fidelity voice delivered at 24 kbps, or high fidelity stereo delivered at 80 kbps.

With the RTP header extension filtering mechanism, the MCRE can also be extended to incorporate 'out-of-band' media transport mechanisms such as using a network FTP server and associated FTP conference folders to reliably transport media in file formats such as image 'snapshots' sequences when FEC is insufficient or impractical, or the network environment necessitates alternatives for UDP delivery failures resulting from excessive packet loss. It also may be desirable in instances when only a single image is needed for an extended period of time.

FIG. 5 shows a conference with a RTP Media Endpoint #1 512 performing the function of a traditional Multipoint Conferencing Unit or Multipoint Control Unit (MCU). The RTP media streams from the other participants in the conference are routed by the RTP MCRE only to the endpoint #1 where they are consolidated into composite media streams and resent back to the RTP Media Server to be routed by the RTP MCRE to each of the other participant devices. If the media is audio, the composite media is the result of decoding each of the receive audio streams according to the payload type of each stream, mixing the local and decoded audio streams and then transmitting the encoded audio stream back to the RTP Media Server. For video media, the consolidated media would have been assembled from the local and decoded video streams with either a video processing application or by periodic encoding of ordered displayed rendering of the video streams. For simplicity, the drawing shows a single media stream from each endpoint device including the endpoint providing the MCU functionality which could have transmitted multiple streams for the composite media encoded differently to match possibly differently encoded received media streams. The differently encoded composite streams would have then been routed to the appropriate endpoint device by the RTP MCRE.

Information provided by the Conference Profile to the SIP or Websockets Server includes Conference Session level attributes, and RTP Session level attributes. Each RTP Session level is mapped to a single media attribute which establishes the associated media stream. The Conference Profile provides a list of all the media streams that will be offered to the participant RTP endpoints when they join a conference using the SIP or Websocket server. This allows a multitude of MCRE routing scenarios, particularly when the Conference Session includes a variety of participant RTP endpoints with different media stream requirements such as Smart Phones (Android, iPhone), Tablets (Android, iPad), NoteBook Computers and so on, each with different display, codec, and network connectivity characteristics. It is easy to see that Conference Session with a number of heterogeneous participant RTP endpoints can result in a variety of heterogeneous media streams differentiated by many factors such as:
1. Media payload type—for example H264, H264 SVC, VC-1, VP8, PCMU, iLBC, Siren7.
2. Media settings—for example Base or Main video profiles, video frame capture resolution or frame rate, 720 p, 1080 p, 8 ksps, 16 ksps.
3. Maximum Network Send and/or Receive Bandwidth—for example WiFi, Cellular 4G, DSL, Cable Modem, Fiber.
4. Network Environment—Congestion, traffic types (media files, email, VOIP, e-learning), Wireless, Managed versus unregulated.

The following example provides a routing scenario that illustrates the versatility of a routed RTP media conferencing system integrated with the MCRE:

A Conference profile provides the following media list:
1. H264 Base Profile with send/receive bandwidth: 100 kbps maximum
2. H264 Advanced Profile with send/receive bandwidth: 600 kbps maximum
3. H264 Advanced Profile with FEC with send/receive bandwidth: 1000 kbps maximum
4. VC-1 with send/receive bandwidth: 50 kbps maximum
5. VC-1 with send/receive bandwidth: 250 kbps average, 350 kbps maximum
6. PCMU
7. G722.1 with bitrate=24000

The extmap attribute is included indicating support for three additional conferencing capabilities:
1. A fallback video mode that provides image file sequencing using a conferencing FTP server url specified in the extmap attribute 2. Media Mixing service for all listed codecs, video and audio 3. Media Translation service for all listed codecs, video and audio Also included in the Conference Profile is a requirement that at least one participant RTP endpoint be present to provide Media Mixing and Media Translation for each supported payload type.

The MCRE is configured with the following rules:

1. Media mixing for a RTP session is always required by the endpoint if only one session is requested for a given media type (video and audio are types) and the extmap attribute is not provided as a RTP session attribute.

2. Media translation will attempt to match media attributes for the target media format.

Four participant RTP endpoints join the conference.

Participant RTP endpoint #1, provides Media Mixing and Media Translation services, is required for the duration of the Conference Session, and may be either a user client, possibly a Conference Administrator with a Desktop Computer or a computer Media Mixer/Translator Server joined to the conference as a participant RTP endpoint. This participant must support all the listed media types and is configured to send/receive all the provided media types. Participant #1 connects to the conference with high-speed (20 Mbps up/down minimum) cable network and establishes connections on all supported RTP Media Sessions but initially sends and receives on RTP Media Sessions G722.1 and VC-1 250 kbps.

Participant #2 is a smartphone device running a commercial SIP/RTP application with support for a single audio media stream and a single video media stream. Also, this endpoint does not provide support for the media extmap attribute which implies no support for the RTP Extension Header as well. Participant #2 connects to the conference over a 4G cellular service with support for only RTP Media Sessions G722.1 and H264 Base Profile.

The MCRE routes the video and audio streams received from participant #2 to participant #1. The MCRE inserts RTP Extension Header signaling to participant #1's video and audio streams indicating the need for media mixing. Participant #1 sends mixed video on the RTP Session H264 Base and mixed audio on the RTP Session G722.1 which are routed to participant #2 with signaling in the RTP Header Extension indicating media mixing for both sessions. The RTP Header Extension signaling indicating media mixing should be ignored by the receiving commercial SIP/RTP application.

Participant #3 is a notebook computer running a platform independent browser based SIP/RTP application that supports multiple video RTP Sessions and multiple audio RTP Sessions. This endpoint supports RTP Media Sessions H264 Basic, H264 Advanced, H264 Advanced with FEC, G722.1, and PCMU and connects to the conference with an 802.11n wireless network and establishes connections on all supported RTP Media Sessions but initially sends and receives on RTP Media Sessions G722.1 and H264 Advanced.

The MCRE routes the video and audio streams received from participant #3 to participant #1. The MCRE inserts no RTP Extension Header signaling to participant #2's video and audio. Participant #1 mixes the new video stream with the mixed video on the RTP Session H264 Base and the new audio with the mixed audio on the RTP Session G722.1 which are routed to participant #2 without any modifications to the RTP Header Extension. The MCRE also starts routing the RTP Sessions H264 Base and G722.1 to participant #3.

Participant #4 is a desktop computer running a Microsoft Windows native SIP/RTP application that supports multiple video RTP Session and single audio RTP Session streaming. This endpoint supports the media extmap attribute, VC-1 50 kbps, VC-1 350 kbps, and PCMU (without extmap attribute) and connects to the conference with a DSL network (80 kbps-250 kbps up and 800 kbps-4 mbps down) and establishes connections on all supported RTP Media Sessions but initially sends and receives on RTP Media Sessions PCMU and VC-1 250 kbps.

The MCRE routes the video stream received from participant #4 to participant #1 and the audio streams received from participant #4 to participant #1 and #3. The MCRE inserts RTP Extension Header signaling to participant #4's video stream signaling the need for media translation and also inserts RTP Extension Header signaling to participant #4's audio stream indicating the need for media mixing. Participant #1 mixes the new video stream from participant #4 with the mixed video on the RTP Session H264 Base and also the new audio stream with the mixed audio on the RTP Session G722. Participant #1 also starts sending the mixed audio on the RTP Session PCMU. Participant #1 translates video streams from itself, and participants #3 and #2 to the RTP Session VC-1 350 kbps and inserts media translation signaling in the RTP Session VC-1 Extension Headers. The MCRE routes the translated VC-1 streams to participant #4 in the RTP Session VC-1 350 kbps and also the mixed audio on the RTP Session PCMU with mixed media signaling indicated in the RTP Extension Header.

To illustrate dynamic adaptation of the system during an active conference, let the DSL network connection to participant #4 start to degrade with increasing frequency down to 80 kbps on direction from the endpoint to the RTP Media Server. Participant #4 receives RTCP reports and possibly RTP Extension Header signaling that video packets are being lost. Participant #4 stops sending on RTP Session VC-1 350 kbps and starts sending on VC-1 50 kbps. The MCRE routes the new stream to participant #1 and inserts signaling in the RTP Extension Header. Participant #1 stops receiving the RTP Session VC-1 350 kbps stream and after a timeout period, stops sending and translating media for RTP Session VC-1 350 kbps. Participant #1 translates video streams from itself, and participants #3 and #2 to the RTP Session VC-1 50 kbps and inserts media translation signaling in the RTP Session VC-1 Extension Headers. The MCRE routes the translated VC-1 streams to participant #4 in the RTP Session VC-1 50 kbps. Participant #1 also starts mixing the new RTP Session VC-1 50 kbps video with the existing RTP Session H264 Base mixed video.

To further illustrate dynamic adaptation of the system during an active conference, let the 802.11n network connection to participant #3 begin to experience heavy congestion and interference from other wireless networks within the vicinity. As participant begins to detect packet loss on both the receive side as well as indications from RTCP reporting and possible RTP Extension Header signaling, action is taken to first try the lower bandwidth RTP Session H264 Base but this attempt also results in similar packet loss issues. A second action is to try the RTP H264 Advanced with FEC and for a while the packet loss issue is resolved. However after a while the congestion and interference increases, perhaps as more and more tenants in the building increasingly use the wireless networks after returning home in the evening. Eventually the packet loss is so terrible the video sent by participant #3 is no longer useable and neither are any of the received video streams. This is bad since participant #3 was participating in an important business meeting and needed to see a document that was being discussed. Fortunately the system detects that the document sharing media stream RTP Extension Header signaled the availability of image file sequences on the FTP server with the URL obtained earlier with the media extmap attribute. This fallback media transport mechanism uses TCP to reliably transport the image file sequences and with the ability of the audio stream to more successfully survive a level of usability from packet loss, the important conference presentation is still able to continue successfully.

This example illustrates the dynamic adaptive routing feature of the MCRE as well as a method of extending the packet processing by moving up the network communications stack with decision logic used to route packets to RTP ports connected to other applications. In this example Participant #1 is used to provide media mixing and media translation services. Additional applications such as conference recording, Voice Activity Detection (VAD) with silence suppression, and more sophisticated Floor Control can be developed and accessed similarly through the MCRE's adaptive routing capability.

It is claimed:

1. A method for routing RTP (Real-time Transport Protocol) media streams in a standards based Routed RTP Media Conferencing System, the method comprising:
   managing a list of conferences using an RTP Media Conference Routing Engine wherein each conference contains a Conference Profile, a list of participant RTP endpoints with associated participant profiles, and a list of RTP media sessions; and
   managing routing of RTP media streams amongst the list of participant RTP endpoints within each conference RTP session according to routing logic algorithms based on data provided by the RTP packet header, the list of RTP session participant RTP endpoints, and a Conference Database within the Routed RTP Media Conferencing System,
   wherein the RTP media streams can be multiple streams from the same media generator source where at least two streams of a particular media type during a single conference RTP session are encoded with a different format according to the media attributes with the associated conference RTP media session list element and such streams can be properly routed to participant RTP endpoints according to the routing logic and data,
   wherein the data provided by the RTP packet header to the routing logic algorithms includes the SSRC (Synchronization Source) Identifier, the X (Extension) flag, and the Extension header; and
   wherein the RTP media stream includes data in the RTP Extension header that signals the routing logic that the media stream contains composite streams from a participant RTP endpoint performing the services of a media mixing MCU and that the composite streams can be routed to participant devices that are only able to process single media streams.

2. The method of claim 1, wherein the routing of the RTP media streams is performed based on the data in the RTP packet header.

3. The method of claim 1, wherein Conference Profile data is provided by a Conference Database within the Routed RTP Media Conferencing System.

4. The method of claim 1, wherein participant profile data are provided by a Conference Database within the Routed RTP Media Conferencing System as well as the associated participant RTP endpoint.

5. The method of claim 1, wherein the data associated with each element in the RTP media session list is obtained from the Conference Database, the participant RTP endpoints that are members of the RTP media session, and the RTP Media Server.

6. The method of claim 1, wherein the RTP media streams can be multiple streams from the same media generator source where each stream can be encoded with a different network bit rate within the associated media attributes with the associated conference RTP media session list element and such streams can be properly routed to participant RTP endpoints according to the routing logic and data.

7. The method of claim 1, wherein the RTP media streams can be multiple streams of encoded layered media from a codec with SVC (Scalable Video Coding) according to the media attributes with the associated conference RTP media session list element and such streams can be properly routed to participant RTP endpoints according to the routing logic and data.

8. The method of claim 1, wherein the RTP media stream can include data in the RTP Extension header that can signal receiving participant RTP endpoints the availability of network accessible media files generated from the media stream, such as image files on an FTP server.

9. The method of claim 1, wherein the RTP media stream can include data in the RTP Extension header that can provide future signaling methods as needed to either the routing logic or receiving participant RTP endpoints.

10. The method of claim 1, wherein the routing logic behavior can be altered by both executable scripts loaded from the Conference Profile and the RTP Extension Header.

11. The method of claim 1, wherein the participant RTP endpoints within a given conference can be heterogeneous devices in terms of network connectivity, hardware characteristics, and system software; such as a conference with a variety of smart phone, tablet, notebook, laptop, and desktop devices all with differing operating systems and browsers.

12. A method for managing a series of real time conferences, each compliant with the Real-time Transport Protocol (RTP), the method comprising:
   maintaining a list of conferences, wherein each conference within the list contains a conference profile including a list of participant RTP endpoints including associated participant profiles, and associated RTP media sessions;
   routing RTP media streams amongst the list of participant RTP endpoints within each conference based on data provided by the RTP packet header, the RTP Packet header including a synchronization source (SSRC) identifier, an extension (X) flag, and an extension header, the data further including the associated RTP media sessions for the list of participant RTP endpoints;
   wherein the RTP media streams can be multiple streams from the same media generator source where a least two of the RTP media streams of a particular media type during a single conference RTP session are encoded using different encoding formats dependent upon attributes of a media type being transmitted in the RTP media streams and the participant profiles, the RTP media streams properly routed to appropriate participant RTP endpoints; and
   wherein the RTP media streams include data in the RTP Extension header that signals the routing logic that the media stream contains composite streams from a participant RTP endpoint performing the services of a media mixing MCU and that the composite streams can be routed to participant devices that are only able to process single media streams.

\* \* \* \* \*